Aug. 11, 1931.  J. G. CAPSTAFF  1,817,963
COLOR PHOTOGRAPHY
Filed June 4, 1928
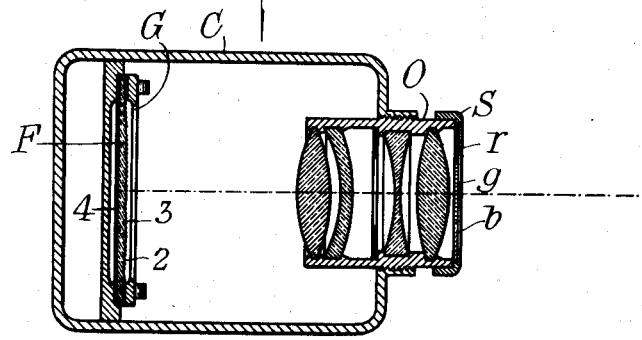
FIG_1_
FIG_2_
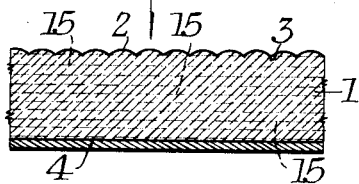
FIG_3_
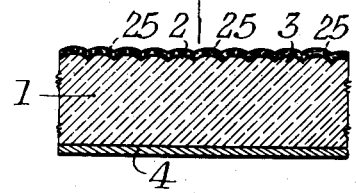
FIG_4_
Inventor
John G. Capstaff, Patented Aug. 11, 1931

1,817,963

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

COLOR PHOTOGRAPHY

Application filed June 4, 1928. Serial No. 282,706.

This invention relates to photography, and more particularly to films for taking natural color pictures. One object of my invention is to provide a film for color photography in which halation is reduced to a minimum, so that the colors are not degraded. Another object is to provide a suitable light absorbing medium between a camera lens and the sensitive emulsion which may transmit image-forming light rays, and retard if not entirely absorb halo forming light rays. Another object is to provide a film with a light absorbing medium adapted to transmit sufficient light rays to a panchromatic emulsion for forming an image thereon, said medium also being adapted to absorb sufficient reflected halo forming light rays to reduce degradation of the image to a minimum, and other objects will appear from the following specification, the novel features being particularly pointed out in the following specification, and in the claims at the end thereof.

In motion picture and in still natural color photography, film is sometimes provided with elements adapting it for color work, such as lenticular elements or color screens which may be incorporated in the film or which may be placed in contact with the film support, so that light rays passing through the support reaches an emulsion, generally a panchromatic one, on the opposite side of the film base.

In ordinary photography the term "halation" is frequently used to designate light rays scattering and reflected in the film base and from surfaces thereof which degrade the image, frequently spoiling the definition or sharpness of the picture.

In natural color photography this same thing—halation—occurs, but the result is much more noticeable and much more undesirable; because in addition to spoiling the definition of the picture the colors are also degraded, so that their relative color values are untrue to nature and are not pleasing to the eye.

My present invention relates to the reduction of halation in films designed for natural color photography, and particularly in films including lenticular or other areas through which light rays pass to an emulsion.

Coming now to the drawings wherein like reference characters denote like parts throughout,—

Fig. 1 is a diagrammatic section through a camera and film made in accordance with and embodying a preferred form of my invention;

Fig. 2 is a greatly enlarged fragmentary section through a portion of the film shown in Fig. 1, a portion of the showing being diagrammatic;

Fig. 3 is an enlarged section showing another embodiment of my invention;

Fig. 4 is a similar view of still another embodiment of my invention.

As shown in Fig. 1 diagrammatically a film sheet designated broadly and as a whole as F may be used in a camera C including an objective O, the film F being located in position for exposure behind an exposure frame or gate G. This camera may be either for still or motion pictures.

The word film is used in its generic sense to designate the support for a light sensitive emulsion which may be either glass or more flexible or plastic material, such as a composition including a cellulose ester or ether, viscose or the like. By film sheet I intend to be understood either small sections of film for a single exposure, longer bands taking the usual six, ten, or twelve exposures and the long bands used in motion picture work.

In the preferred embodiment of my invention, as shown in Fig. 2, the film sheet comprises a base or support 1, having minute lenticular areas 2 over that surface 3 which faces the camera objective O. Opposite this side there is a panchromatic gelatino silver halid emulsion layer 4.

The support 1 has incorporated therein a dye 5 which will absorb a portion of all light rays passing through the camera objective to the emulsion layer 4, and I prefer to provide this dye 5 in such concentration that it may transmit about 80% of the image forming light, about 20% being absorbed in passing through the support to the emulsion.

The dye 5 incorporated in the film support 1 is preferably of a type that is easily bleached out by the action of light or other form of radiation, such as infra red or ultra violet rays. Such dyes may be, for example, the cyanins, isocyanins, and carbocyanins, such as are commonly used to sensitize photographic emulsions to various portions of the spectrum.

I prefer to use as a specific example a dye such as those described in the patent to Adams and Haller, No. 1,374,872, granted April 12, 1921, and known as kryptocyanine in a mixture of one part ethyl acetate and two parts of ethanol (grain alcohol), this being readily absorbed by the film; coloring it a pale blue. This color is fairly stable in the dark, but bleaches out when exposed to a powerful light source or to sunlight.

A small portion of dye may thus be used to reduce halation. It should be noted that an image-forming light ray $a$ (Fig. 2) coming perpendicularly to the emulsion, passes through the support, only once and may be absorbed to the extent of say 20%, and it should also be noted that the halo forming rays being twice obliquely reflected at $d$ and $e$, pass through the support three times, as shown by the lines $a$, $b$, and $c$; and thus, whereas only 20% of the image forming light rays are absorbed, at least 50% of the halation forming light rays are absorbed, and usually more, because of the oblique paths.

From Fig. 2 it will appear that halation in natural color photography not only destroys definition, as it does in black and white, but in addition degrades the colors. The areas R, G, B designate minute images of the color bands $r$, $g$, and $b$ of filter S placed on the objective O. A light ray $a$ may pass through a lenticular element 2 and by it be directed to the emulsion 4 where it makes a green area record, but if this ray continues along the lines $b$ and $c$ without being absorbed it may reach the emulsion at a blue area record as indicated at $f$, as the reflected rays are distributed haphazardly over the various filter images, thus producing untrue and degraded color images and also destroying definition or sharpness of the picture which can be seen when the processed film is projected.

However, I have indicated in Fig. 2, by gradually lightening lines $a$, $b$, and $c$, that by the absorptive dye in the support 1 while the image forming ray is somewhat reduced in intensity in passing through the support, the reflected halo forming rays are much more reduced so that by the time they again reach the emulsion they may be reduced to a harmless, or unnoticeable extent.

The density of the dye can be regulated to entirely eliminate halation, but if this is done considerable light is lost, being absorbed before it makes an image through the base. Consequently, after considerable experimenting, I have found that a dye density which absorbs about 20% of the image forming light is most suitable for natural color motion picture work. Of course, if less exposure is permitted the dye intensity may be increased, or if more is required it may be decreased. However, the percentage given is entirely satisfactory, and reduces the halo and degradation of the image to a point where it cannot be visually determined.

Obviously, there are many ways in which the dye may be applied, it being only necessary that the dye lie between the camera lens and the emulsion.

Accordingly in Fig. 3 I have shown a dye 15 evenly distributed through the film support 1, this may be done by putting the dye directly in the film base dope.

In Fig. 4 the dye 25 is in the form of a layer distributed in an even coat over the lenticular areas 2 of the film base. It may be applied as a very thin layer either before or after the lenticulations are formed.

It is to be noted that in all of the forms described the emulsion is on the side of the plate or film that is intended to be faced away from the objective and the light rays reach it after passing through the support and through elements which selectively modify them to form a color record image in the emulsion.

Of course, where the dye is in a layer which is thin, the density must be greater than where distributed through a thicker layer as in the film base. As shown in Fig. 2, the dye 5 is not evenly distributed through the entire film base 1; but is denser at one side as it is applied in an alcoholic solution which is absorbed by the base, and being applied to one side only is denser on that side. It is not material just how the dye is applied, but only that the layer of dye is of the correct total density for the particular work in hand.

While I have described as a suitable dye, one that may bleach out through radiation; such bleaching while desirable is not essential. Where the full dye density remains in the film sheet, the difference between a projected image from such a film (when say 20% of the transmitted light is absorbed) from a film passing practically all the light can only be obtained through a densitometer, and is not visible to an untrained eye. In fact, the added sharpness and purity of color is such that the average untrained observer would say the film prepared as disclosed in this application is brighter, whereas actually it would be less bright.

I do not, therefore, limit myself to a bleachable dye, although, I prefer to use a dye which will either partially or entirely bleach out. As continual exposure to light bleaches the dye, of course, each time it is projected it is additionally bleached out, but in any event, whether or not the dye bleaches out a superior image and color film results.

It is, of course, desirable since all colors are to be recorded, that the dye absorb light of all wave lengths, though it need not do so to the same extent. A certain amount of color selectivity may, indeed, be desirable to compensate for differences in color sensitivity of the emulsion.

Having thus described my invention, what I claim as new and desire to secure by Letters Patent is:

1. A film sheet for natural color photography comprising a single light-transmitting support, a panchromatic emulsion on one surface of the support and the other surface carrying minute lenticular elements particularly adapting it for a color process of a type requiring light rays to pass through the support before reaching the emulsion, there being in the film sheet a layer including a dye absorptive of light of all colors and positioned between the emulsion layer and the opposite surface of the film sheet and transmitting at least seventy per cent of light passing once directly through said layer and unaffected by ordinary photographic baths.

2. A film sheet for natural color photography comprising a light transmitting support of a cellulosic compound having formed in one surface thereof minute lenticular elements, a panchromatic emulsion on the other surface, and a dye absorbing light of all colors carried directly by the film support, said dye being unaffected by the photographic baths.

Signed at Rochester, New York, this 26th day of May, 1928.

JOHN G. CAPSTAFF.